May 8, 1951          E. F. SARVER          2,552,384
VALVE
Filed Oct. 30, 1944          3 Sheets-Sheet 3
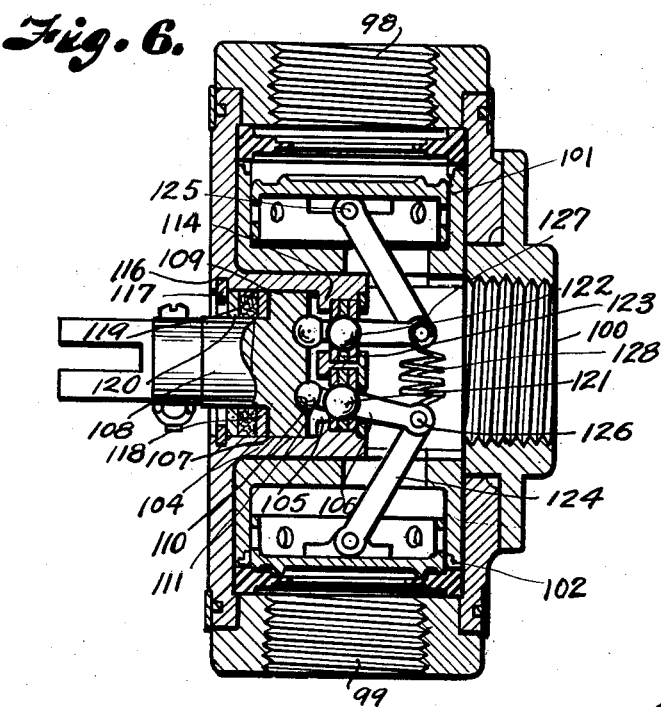
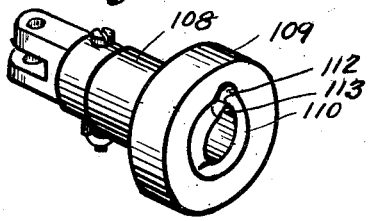
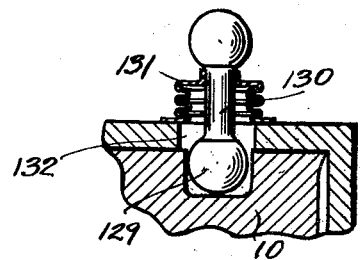
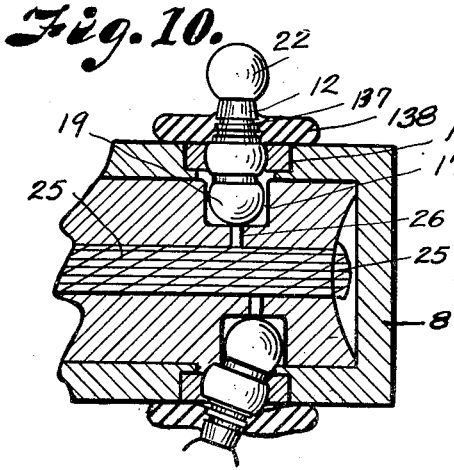
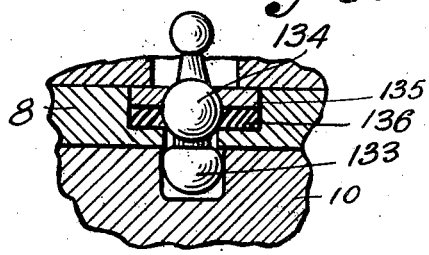
Inventor
Emmett F. Sarver.
By Fishburn & Mullendore,
Attorneys Patented May 8, 1951

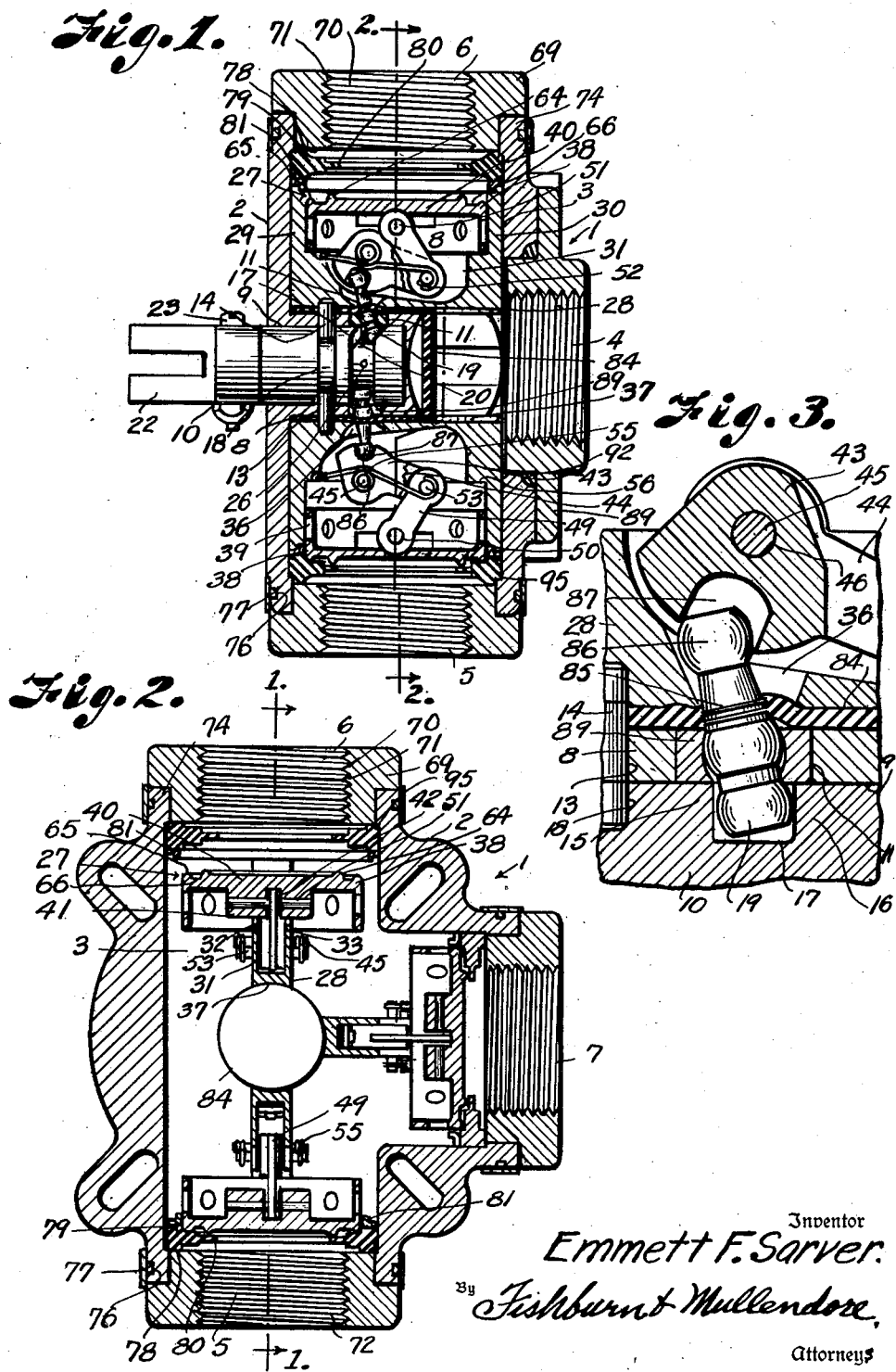

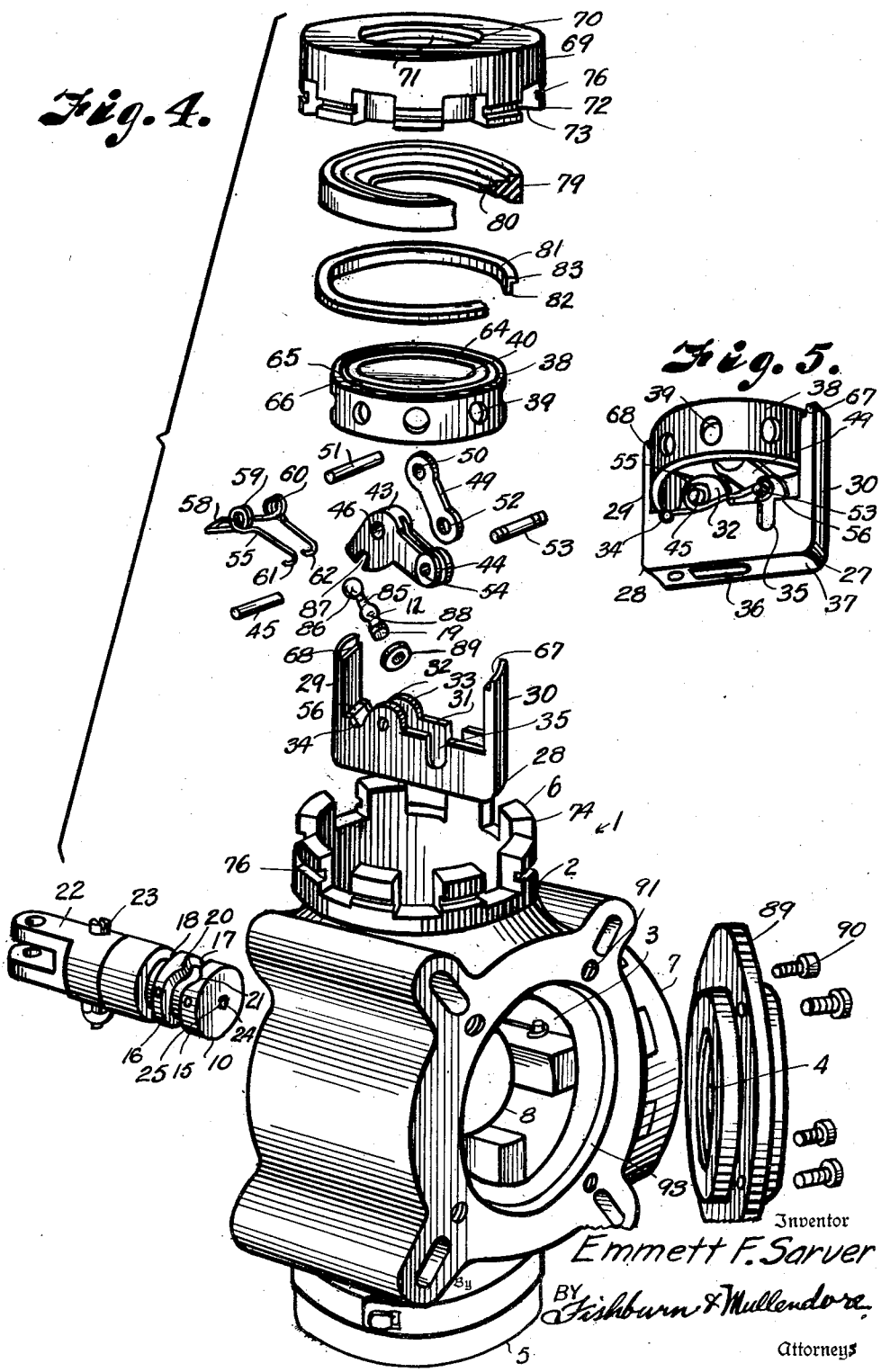

2,552,384

UNITED STATES PATENT OFFICE 2,552,384

VALVE

Emmett F. Sarver, Erie, Pa., assignor, by mesne assignments, to J. Russell Dunnihoo, Erie, Pa.

Application October 30, 1944, Serial No. 561,038

8 Claims. (Cl. 251—132)

This invention relates to valves, and particularly valves having a plurality of ports, and is adaptable for use in lines carrying high test gasoline, although it may be used with any kind of fluids.

With valves as constructed and in use at the present time the parts usually become worn after a short period of use due to the gasoline or other fluid drying and hardening the sealing parts and glands for lack of lubrication, causing leakage around the operating shaft.

The principal object of the present invention is, therefore, to provide a valve constructed so that the fluid within the valve will not contact with the shaft, bearings and actuating mechanisms of the valve.

Other objects of the invention are to provide flexible sealing means between the shaft chamber of the valve and the actuating parts thereof; to provide means for holding the valve in open or closed position; to provide means for lubricating the bearing surfaces and toggle members of the valve; and to provide a valve of simple construction which is economical to manufacture and efficient in operation.

Fig. 1 is a longitudinal cross-sectional view of the valve, taken on a line 1—1, Fig. 2.

Fig. 2 is a cross-sectional view of the valve taken on a line 2—2, Fig. 1.

Fig. 3 is an enlarged fragmentary section through one of the toggle mechanisms particularly illustrating the sealing means.

Fig. 4 is a perspective view of the valve showing the parts in disassembled relation.

Fig. 5 is a perspective view of the poppet assembly.

Fig. 6 is a longitudinal sectional view of a modified form of the invention.

Fig. 7 is a perspective view of the operating shaft for the form of valve shown in Fig. 6.

Fig. 8 is an elevational view of a modified form of toggle member and sealing means.

Fig. 9 is an elevational view of a further modified form of toggle member and sealing means.

Fig. 10 is an elevational view of the toggle members and sealing means, and illustrating the method of lubricating the same.

Referring more in detail to the drawings:

1 designates a valve embodying the features of my invention comprising a body or housing 2 having a chamber 3 provided with a fluid inlet port 4 and fluid outlet ports 5, 6 and 7. The side of the housing 2 opposite the inlet port 4 is provided with an inwardly extending hub or sleeve 8 containing a cylindrical bore 9 adapted to receive an actuating shaft 10, later described.

The hub 8 is provided with openings 11 through which toggle members 12 are extended, and also with apertures 13 through which pins 14 are inserted for holding the shaft 10 in the bore 9.

The shaft 10 is provided on its inner end with cams 15 and 16 forming annular grooves 17 and 18 in said shaft. The groove 17 receives a ball like end 19 of the toggle member 12. The cam 16 is provided with an outwardly flared portion 20 which extends into the groove 17, and the cam 15 is provided with a recess 21 opposite the outwardly flared portion 20 and of the same contour for a purpose later described. A yoke 22, having a socket is fitted over the outer end of the shaft 10 and fastened thereon by a fastening device such as a bolt 23. The shaft is provided through its center with a channel 24 through which lubrication may be supplied to the cam actuating mechanism. I also provide the oil channel with a wick 25 as shown in Fig. 10, and ports 26 leading from the channel 24 to the cam groove 17.

Located within the ports 5, 6 and 7 in the body 2 and adapted to rest against the hub 8 of said body opposite said ports are poppet assemblies 27 constructed to open and close said ports by turning the shaft 10 as later described.

Each poppet assembly includes a body portion 28 having upstanding posts 29 and 30. The body portion 28 has a channel 31 and is provided with ears 32 and 33 terminating in notches near the post 29. The body 28 also has notches 35 and the channel 31 extends through the body 28 providing an elongated slot 36 in a concave edge 27 of the body member. Located between the posts 29 and 30 is a cylindrical poppet member 38 provided with ports 39 around its outer periphery, and the poppet has a head 40 provided with a boss 41 through which a transverse groove 42 is formed.

A lever 43 having a split end 44 is pivoted on a pin 45 extending through the ears 32 and 33 and through a bearing 46 in said lever. A link 49 having a bearing 50 in one end is attached to the boss 41 in the poppet 38 by a pin 51. The opposite end of the link is provided with a bearing 52 adapted to fit in the split end 44 of the lever 43 and is pivoted thereto by a pin 53 through bearing 54 in the split end of said lever.

A spring 55 is provided for exerting tension on the poppet member 38 to hold it in open position so that the edges of the chamber rest on the shoulders 56 of the body member of the poppet assembly. The spring 55 (see Fig. 4) has a U-shaped end 58 which rests in the notches 34 in the body member 28. Coils 59 and 60 are provided on the spring adapted to fit over the respective ends of the pin 46. The opposite ends of the spring have hooks 61 and 62 which engage the ends of the pin 53 which rests in the notches 35 when the poppet is in open position.

The head 4 of the poppet member 28 is provided with an annular rib 64 spaced from and extending slightly above an outer annular rib 65 of the poppet member and the space between forms an annular recess 66. The outer ends of the posts 29 and 30 are offset forming shoulders 67 and 68, for a purpose later described.

Port fittings 69 are provided to fit in the port openings 5, 6 and 7 of the valve body. The fittings are provided with openings 70, having screw threads 71 adapted to receive fluid ducts (not shown). Around the outer periphery of the fittings are flanges 72 having notches 73 therein (see Fig. 4). The valve ports 5, 6 and 7 are provided with outwardly extending notched flanges 74 adapted to receive the notched port fittings 69. The respective notched flanges 72 and 74 have an annular groove 76 substantially midway of their length adapted to receive a split ring 77 for holding the fittings in place (see Figs. 1 and 2). The ring 77 is preferably made of spring material and in its normal position is smaller than the groove in the port fittings and flanges. When the ring is applied it is extended in the usual manner and when inserted over the groove snaps in place to hold the fittings securely to the valve body.

Located in the respective valve ports 5, 6 and 7 and adapted to fit against the face 78 of the port fittings 69 are rings 79 preferably made of rubber forming a seat for the poppet member 38. The valve seat 79 is also preferably formed with an annular lip 80, the lip being flexible will follow the poppet down a short distance should there be a reverse flow of fluid thus making it impossible for a reverse flow of fluid to open the valve.

I also preferably provide between the valve seat 79 and the poppet 38 a load bearing ring 81 to facilitate seating of the valve. The ring is constructed so it has a depending flange 82 adapted to seat on the shoulders 67 and 68 of the posts 29 and 30 of the body of the poppet assembly while the outwardly flared portion 83 of the ring engages the top of said posts.

A principal feature of my invention is to avoid leakage of fluid to the actuating part of the valve mechanism and particularly the cam actuating mechanism in the shaft chamber. I, therefore, provide a cap 84 preferably made of rubber or other resilient material, for fitting around the hub or sleeve member 8. The cap is preferably vulcanized to said sleeve and is provided with openings corresponding with the openings 11 and 13 in said sleeve, through which the toggle members 12 and pins 14 are extended. The rubber cap fits tightly around the pins 14 to prevent leakage therearound. The shank of the toggles 12 is provided with peripheral ribs 85, as best illustrated in Fig. 3, and the rubber cap is bonded, preferably by vulcanizing, thereto to provide a tight seal and yet allow for movement of the toggle members.

The toggles 12 also have ball shaped terminals 86 opposite the ends 19 for engaging in an opening 87 in the poppet lever 44. The toggles extend through the openings 11 in the hub 8 and the ball shaped ends 19 engaged in the cam groove 17 of the shaft 10. I also provide a ball shaped enlargement 88 on said toggles and a bearing 89 adapted to fit in the opening 11 in said hub and in which the ball portion 88 moves to facilitate movement of the toggles.

An internally screw-threaded flange fitting 89 is provided to be attached to the body 2 by screws or the like 90 engaging in threaded apertures 91 in the body of said valve for receiving a fluid inlet pipe (not shown). A gasket 92, preferably made of rubber, is provided to fit on a rounded shoulder 93 of the valve body for sealing the flange fitting to said body.

In assembling a device constructed as described, the shaft 10 is inserted in the chamber formed by the hub 8 and the locating pins 14 inserted through the opening 13 in said hub and the inner ends of said pins fitting in the groove 18 in said shaft. It will be noted that the ends of the pins are chamfered to facilitate location of the pin and their inner ends are adapted to fit in the groove 18 thus allowing the shaft 10 to rotate. The toggles 12 are vulcanized in the rubber cap 84 and the cap inserted over the hub 8 and is vulcanized thereto. The cammed end 19 of the toggle will be inserted through the opening 11 in the hub and is adapted to work in the groove 17 of the shaft 10 as shown in Fig. 1. The rubber cap will prevent fluid within the valve body from coming in contact with the shaft, shaft bearings and actuating cam of the valve actuating mechanism. The cap 84 is also provided with openings registering with the opening 13 in the hub for insertion of the pins 14 therethrough. The pins 14 will then extend slightly above the rubber cap as is also shown in Fig. 1.

The poppet assemblies 28 are then inserted in the ports 5, 6 and 7 in the valve body so that their edges 37 will contact the rubber cap around the sleeve 8. A recess 94 is provided in the edge 37 of the poppet assembly in which the chamfered ends of the locating pins 14 register. The cammed end 86 of the toggle 12 extending through the rubber cap 84 is inserted in the opening 87 of the poppet lever 44 also as illustrated in Fig. 1.

After the poppet assemblies are inserted in the ports, the locating rings 81 are then inserted in the port openings so that they will contact the posts 29 and 30 of the poppet assembly and then the rubber seating ring 79 is placed over the locating ring so that its outer surface will bear against the port fittings 69 which are adapted to fit in the port openings. The valve body is preferably provided with an annular shoulder 95 at the outer shell of the valve housing around the port openings against which the valve seating ring rests 79 as shown in Fig. 1. The split snap ring 77 is then fitted in the groove 76 in the flanges of the fittings and the housing so that when the ring is snapped in place the port fittings will be held securely in place. Joinder of the fittings by the snap ring provides greater resistance to torsion, and is quickly assembled so that time is saved over the old manner of using screws to fasten the fittings in place. Such assembly greatly reduces break off of fittings when a pipe wrench is used in connection therewith. By use of the snap ring a predetermined pressure may be applied to the gasket. The valve seat is preferably made of rubber and therefore acts as a port fitting gasket thus preventing leakage and requirement of additional parts in assembling a valve of this character.

After the insertion of the poppet assemblies a gasket 92 may be placed over the inlet port 4 on the shoulder 93 of the body and the flange 89 fitting then applied thereto by the screws 90. The entire valve may then be connected to the inlet and outlet pipes (not shown) as desired.

Operation of a valve constructed as described is as follows:

First, it will be noted that the present valve has no packing box, thus affording a longer bearing and eliminating leakage trouble. The cam is of small diameter and is arranged so that it will have a motion parallel with the axis of the shaft instead of radially as in conventional practice. Fluid entering through the inlet port will surround the poppet assemblies in the valve port and the rubber cap 84 prevents the fluid from coming in contact with the shaft, bearings and actuating mechanism in the chamber provided by the hub 8 in said housing. With the cam end 19 of the toggle member 12 in the cam groove 17 in the shaft 10, the poppet 38 will seat against the locating ring 81, which in turn seats against the flexible valve seat 79 which seals against the port fittings 69. When it is desired to open the valve, the shaft 10 may be turned through yoke 22 by suitable means, thus causing cam 19 of one of the toggles to follow the cam groove 17 until it comes to the outwardly extending portion 20 in said groove, which forces the cam 22 of the toggle member into the notched portion 21 in said cam groove, thus causing a toggle action of the toggle and the opposite cam 86 on said toggle acting fitting in the opening 87 in the poppet lever 44 will cause the pressure on the poppet spring 55 to be released and thus allow the valve to be closed through said poppet. Conversely, when it is desired to open the valve, the shaft 10 is again turned which causes the cam to be released from the notch provided in the cam groove 17 and all poppets will be closed. As the cam moves, the toggle is rocked in the opening 11 in the hub and the rubber cap being flexible, the toggle rocks through the cap and transmits the cam motion to the multiplying lever arrangement which in turn, moves the poppet for opening and closing the valve. The cam on the shaft acts as an index and eliminates a separate indexing plate which causes trouble from misalignment of the index with the cam, and also requiring additional parts. It will also be seen that the cam which causes the motion of the toggles acts as an index to hold the valve in the open or closed position. The double acting cam arrangement of the present invention acts in a manner that the opening and closing motions are both positive thus eliminating the use of springs to obtain the opposite motion. In the present invention the springs used in the valve are used only to give the valve an index feel so that the operator can determine whether the valve is in its wide open position, and to prevent vibration so as to not move the valve away from its open position.

Referring to the modified form of the invention shown in Fig. 6, the body or valve housing is the same as shown in Fig. 1 except that it has only two outlet ports 98 and 99, and an inlet port 100. The poppet assemblies 101 and 102 are substantially the same except for the poppet lever, link and spring arrangement, as later described.

Referring specifically to Fig. 6, the body or valve housing 2 is provided with an inwardly extending hub or sleeve 104 having openings 105 in the inner end thereof through which toggle members 106 are inserted. The inwardly extending hub or sleeve forms a chamber 107 adapted to receive a shaft 108 for actuating the toggle members. The shaft is provided on its inner end with an enlarged portion 109 forming a cam having a groove 110 in the end thereof adapted to receive the ends 111 of the toggles 106. The cam is provided on one side thereof with a notch or indentation 112. Opposite the notch or indentation in said groove 110 is an outwardly extending portion 113 which actuates the toggle levers on turning of the shaft as later described. The inner end of the hub 104 is provided with a closed end 114. A circular groove 116 is provided to receive a split ring 117 for retaining the shaft in said chamber.

A thrust bearing 118 is inserted over the shaft which bears against the outer rim of the cam 109. I then preferably provide a packing 119 to retain the grease or oil in said chamber for lubricating the valve actuating mechanism. A gland 120 is then placed over the shaft to retain the packing in place and the snap ring 117 then inserted over the outer end of the shaft and when it is released the outer periphery thereof will come to rest in the groove 116.

The outer end of the shaft is provided with the usual yoke assembly as described in connection with Fig. 1.

The toggle members 106 are provided with spherical portions 121 mounted in the end 114 of said hub or sleeve in bearing washers 122 on the respective sides of a gasket 123. The gasket may be vulcanized to said toggles and then vulcanized to the end of the hub in the usual manner as set forth in connection with Fig. 1.

Connected to the outer ends of the toggles are links 124 having their opposite ends connected to the poppets so indicated at 125. The links are connected to the toggles by pins 126 having an end thereof extending slightly outwardly and adapted to receive the respective ends 127 of a coil spring 128 to provide tension on the respective toggle members and to act as an index when manipulating the valve shaft to indicate whether the valve is opened or closed.

Operation of a valve constructed as described and shown in Figs. 6 and 7 in as follows:

Fluid enters the inlet port 100 filling the valve chamber and the valve poppet assemblies are manipulated by rotation of the shaft 108. When the poppets are in the position as shown in Fig. 6 the lower poppet assembly closes the port 99 while the upper poppet assembly is open, thus opening port 98. The ends 111 of the toggles track in the cam groove 110. When the ends 111 are in the circular portion of the groove both poppets will be closed and when the shaft is turned so that one of the ends 111 will contact the inwardly extending portion 113 in cam groove 110, the end will be pushed into the groove 112 so that the toggle will be moved in the end of the hub member, causing the link 124 to close the poppet in the poppet assembly and thus open the valve. The valve may be held either open or closed; and the cam movement acts as an index.

Fig. 8 of the drawings shows a modified form of toggle mechanism preferably having a ball shaped end 129 for connection with the shaft 10 of the form shown in Fig. 1 and a shank 130 to which a metal bellows 131 may be attached, by braising or otherwise, to form a seal around the openings 132 in the hub 8 of the housing.

Fig. 9 shows a further modified form of toggle mechanism having an end 133 inserted in the cam groove in the shaft 10 and having a center ball like enlargement 134 on said toggle adapted to fit in the opening 11 in said hub 8 and having a bearing member 135 in which the cam 134 may rotate. A rubber sealing gasket 136 is also provided for insertion under the bearing member 135.

Referring to Fig. 10, the form of toggle member is the same as that shown in Fig. 1 except that the shank of the toggle 12 is provided with cylindrical grooves 137 and a rubber ring 138 is sealed around said groove and adapted to be sealed over the openings 11 in the hub 8 instead of providing a cap going entirely around the hub as in connection with Fig. 1.

It will be obvious from the foregoing that I have provided improved details in structure, simple, economical to manufacture and capable of operating in an efficient manner.

What I claim and desire to secure by Letters Patent is:

1. In a device of the character described comprising, a valve housing having a fluid inlet port and a fluid outlet port, a poppet assembly in said outlet port, said poppet assembly including a lever, an inwardly extending hub in one side of said housing, a chamber in said hub having an opening therein, a shaft in said chamber, cams on said shaft forming grooves therein, means engaging one of said grooves for anchoring said shaft in said chamber, a toggle extending through said opening in said hub having one end engaging the other of said grooves in said shaft and the opposite end engaging said lever of the poppet assembly, said toggle and cam cooperating to open and close said valve upon turning of the shaft and means for sealing the opening in said hub to prevent fluid from entering said chamber.

2. In a device of the character described comprising, a valve housing having a fluid inlet port and a fluid outlet port, a poppet assembly in said outlet port, said poppet assembly including a lever, an inwardly extending hub in one side of said housing, a chamber in said hub having an opening therein, a shaft in said chamber, cams on said shaft forming grooves therein, means engaging one of said grooves for anchoring said shaft in said chamber, a toggle extending through said opening in said hub having one end engaging the other of said grooves in said shaft and the opposite end engaging said lever in the poppet assembly, said toggle and cam cooperating to open and close said valve upon turning of the shaft, and a rubber cap adapted to fit over said hub for sealing the opening in said hub to prevent fluid from entering said chamber.

3. A device of the character described comprising, a body member having a fluid inlet port and a fluid outlet port, a poppet assembly in said outlet port comprising a body having upstanding posts, a cylindrical poppet engaged between said posts having an annular flange around its outer plain face providing an annular groove around the outer circumference thereof, a hub in said poppet having a bearing, a link having one end pivoted to said bearing, a lever attached to the opposite end of said link, a spring for providing tension to said poppet to hold the poppet in open position, a cylindrical sleeve extending in the body member of said valve having an opening therein, a shaft in said cylindrical sleeve, cams on said shaft forming a groove therein, means for retaining said shaft in said chamber, a toggle member having an enlarged end engaged in said cam groove, said toggle extending through said opening in said sleeve and having its other end engaging the lever in said poppet assembly, means for sealing said opening in said sleeve around said toggle member, and means for turning said shaft to open and close said valve.

4. A device of the character described comprising, a body member having a fluid inlet port and a fluid outlet port, a poppet assembly in said outlet port comprising a body having upstanding posts, a cylindrical poppet engaged between said posts having an annular flange around its outer plane face providing an annular groove around the outer circumference thereof, a hub in said poppet having a bearing therein, a link pivoted in said bearing, a lever attached to the opposite end of said link and a spring for providing tension to said poppet to hold the poppet in open position, a port fitting in said outlet port, means between said port fitting and said poppet assembly for providing a seal between said poppet and said fitting, means for actuating said poppet, and means for sealing said last-named means for preventing fluid from contacting said actuating means.

5. A valve assembly comprising a housing having a fluid inlet port and a fluid outlet port, a valve member in said outlet port, said valve member including a lever, a hub extending inwardly in said housing, a chamber in said hub having an opening in one side thereof, a shaft secured in said hub and operable therein, a toggle member extending through said opening in the hub and having one end engaging said lever of the valve member, means on the shaft engaging the opposite end of said toggle, and means for sealing the opening to prevent fluid from entering said chamber, said first named means moving said toggle upon operation of the shaft.

6. A valve assembly comprising a housing having a fluid inlet port and a fluid outlet port, a valve member in said outlet port, said valve member including a lever, a hub extending inwardly in said housing, a chamber in said hub having an opening in one side thereof, a shaft secured in said hub and operable therein, a toggle member extending through said opening in the hub and having one end engaging said lever of the valve member, means on the shaft engaging the opposite end of said toggle, and means surrounding said hub for sealing the opening to prevent fluid from entering said chamber, said first named means moving said toggle upon operation of the shaft.

7. A valve assembly comprising a housing having a fluid inlet port and a fluid outlet port, a valve member in said outlet port, said valve member including a lever, a hub extending inwardly in said housing, a chamber in said hub having an opening in one side thereof, a shaft secured in said hub and operable therein, a toggle member extending through said opening in the hub and having one end engaging said lever of the valve member, means on the end of the shaft engaging the opposite end of said toggle, and means for sealing the opening to prevent fluid from entering said chamber, said first named means moving said toggle upon operation of the shaft.

8. A valve assembly comprising a housing having a fluid inlet port and a fluid outlet port, a valve member in said outlet port, said valve member including a lever, a hub extending inwardly in said housing, a chamber in said hub having an opening in one side thereof, a shaft secured in said hub and operable therein, means sealing said shaft in the hub, a toggle member extending through said opening in the hub and having one end engaging said lever of the valve member, means on the end of the shaft engaging the opposite end of said toggle, and means for sealing the opening to prevent fluid from entering said chamber, said first named means moving said toggle upon operation of the shaft.

EMMETT F. SARVER.

REFERENCES CITED

The following references are of record in the file of this patent:

UNITED STATES PATENTS

| Number | Name | Date |
| --- | --- | --- |
| 1,291,869 | Heeley | Jan. 21, 1919 |
| 1,301,948 | Kaplan | Apr. 29, 1919 |
| 1,561,474 | McCabe | Nov. 17, 1925 |
| 2,075,600 | Baker | Mar. 30, 1937 |
| 2,163,132 | Roney | June 20, 1939 |
| 2,354,582 | Downey | July 25, 1944 |